United States Patent [19]

Marshall

[11] Patent Number: 4,886,707

[45] Date of Patent: Dec. 12, 1989

[54] POLYAMIDE YARN WITH NONYELLOWING ANTIOXIDANT FINISH

[75] Inventor: Robert M. Marshall, Chesterfield, Va.

[73] Assignee: Allied Signal Inc., Morris Township, Morris County, N.J.

[21] Appl. No.: 214,980

[22] Filed: Jul. 5, 1988

[51] Int. Cl.⁴ .............................................. D02G 3/48
[52] U.S. Cl. ...................................... 428/395; 252/8.8
[58] Field of Search ................ 524/100, 585, 606; 428/395; 544/213; 252/8.8

[56] References Cited

U.S. PATENT DOCUMENTS

| | | | |
|---|---|---|---|
| 3,003,995 | 10/1961 | Schule | 524/606 |
| 3,397,107 | 8/1968 | Kimura | 428/395 |
| 3,917,893 | 11/1975 | Marshall et al. | 428/395 |
| 4,251,409 | 2/1981 | Neubert | 428/395 |
| 4,259,404 | 3/1981 | Van Gils | 428/395 |
| 4,289,683 | 9/1981 | Neubert | 428/395 |
| 4,371,658 | 2/1983 | Marshall et al. | 524/585 |
| 4,569,958 | 2/1986 | Maeda et al. | 524/100 |
| 4,606,972 | 8/1986 | Marshall | 428/395 |

*Primary Examiner*—John Kight
*Assistant Examiner*—Kriellion Morgan

[57] ABSTRACT

An improved polyamide yarn for tire and industrial applications is prepared by applying to the yarn a finish composition comprising a thio-triazine tert-butylphenol product in effective amounts to provide improved adhesion of the fiber to rubber after aging the yarn.

14 Claims, No Drawings

POLYAMIDE YARN WITH NONYELLOWING ANTIOXIDANT FINISH

BACKGROUND OF THE INVENTION

The present invention relates to improved polyamide yarn and to an improved fiber finishing process for polyamide yarn in which fiber finish compositions containing a novel blend of antioxidant compounds are applied to the yarn. The yarns of the invention are of particular interest in the production of tire cord and other industrial applications and display unexpected improvement in aging properties, particularly fiber-to-rubber adhesion retention.

Stabilized polyamide compositions incorporating copper compounds together with diarylamine antioxidants into the polymer are disclosed in U.S. Pat. No. 3,113,120 to Papero et al. Such compositions display resistance to deteriorating effects of light, weathering, and heat. Polyamide compositions incorporating an aging inhibitor which is a diphenylamine-acetone condensation product are disclosed in U.S. Pat. No. 3,003,995 to Schule.

Representative finishes for polyamide yarn to be processed into tire cord include U.S. Pat. No. 4,129,507 to Marshall et al. and U.S. Pat. No. 4,371,658 to Marshall et al. U.S. Pat. No. 3,397,081 to Mayberry discloses a finish composition for nylon tire cord which includes the low temperature reaction product of diphenylamine and acetone. U.S. Pat. No. 4,469,606 to Reid et al. discloses a fiber treating composition comprising a mixture of a specified triazine together with a multifunctional hindered phenol.

U.S. Pat. No. 4,606,972 to Marshall discloses a finish composition for polyamide yarn to provide improved adhesion of the fiber to rubber after aging comprising a diarylamine-ketone condensation product in combination with a specified trione compound. However, while exhibiting excellent improvement in aging properties, the yarn becomes yellowed and discolored when exposed to room temperature storage conditions, an undesirable aesthetic problem.

Applicant has discovered that by applying a novel finish composition comprising a specified hindered phenol antioxidant compound to the surface of the polyamide yarn, such yarns display unexpected improvement in aging properties, particularly the retention of fiber to rubber adhesion, a property essential to tire cord applications. The treated yarn displays excellent nonyellowing properties after storage at ambient conditions.

SUMMARY OF THE INVENTION

A fiber finish comprising effective amounts of a thio-triazine tert-butylphenol antioxidant compound when applied in effective amounts to the surface of a polyamide yarn for processing into tire cord, provides enhanced aging properties for the tire cord, particularly the retention of fiber-to-rubber adhesion after exposure of the tire cord to aging conditions. An exemplary antioxidant compound is 4-[(4,6-bis(octylthio)-s-triazin-2-yl)amino]-2,6,-di-tert-butylphenol.

DESCRIPTION OF THE PREFERRED EMBODIMENT

A thio-triazine tert-butylphenol antioxidant when applied to a polyamide yarn for tire cord in effective amounts, yields enhanced properties after aging, particularly improved retention of fiber-to-rubber adhesion.

The antioxidant compound of the invention is preferable combined with compatible finishes and applied to the polyamide yarn in a conventional manner, for example as a spin finish prior to drawing or as an overfinish system at a time after the drawing has been completed.

The thio-triazine tert-butylphenol antioxidant compounds that are a part of this invention are a known class of compounds useful as antioxidant compounds. An example of a specific compound useful in the invention is 4-[(4,6-bis(octylthio)-s-triazin-2-yl)amino]-2,6,-di-tert-butylphenol. This compound is commercially available under the tradename Irganox TM 565 from Ciba-Geigy Corporation.

The compound is incorporated into a compatible finish system and applied to polyamide yarn in an amount effective to provide enhanced aging properties for tire cord made from the yarn. A preferred range of application is from 0.003 to 0.1 weight percent of the antioxidant compound, based on weight of the yarn. A more preferred range is 0.01 to 0.03 weight percent.

The aging properties of interest in tire cord applications particularly include fiber to rubber adhesion of tire cord made from the yarn after aging of the tire cord. In tire cord applications it is essential that the cord made from the yarn, after treatment with resorcinol-formaldehyde-latex and after then being subjected to aging conditions such as exposure to long periods of warehouse storage and extremes of temperature and humidity, still display acceptable levels of fiber to rubber adhesion.

Additionally, for aesthetic reasons, it is highly desirable that the treated yarn not exhibit any yellowing or discoloration upon storage. Such yellowing is tested by visual inspection after a period of time, for example 72 hours at ambient conditions.

In the examples which follow, yarn was overfinished with the respective antioxidant compounds, twisted into three-ply cords, and prepared for tire application by treatment with a standard resorcinol-formaldehyde-latex dip in a conventional manner. The treated cord was subjected to aging simulation conditions of 8 hours at 300° F. and 40 psi. Following exposure to aging conditions the cords were then subjected to the "U" adhesion test to measure fiber to rubber adhesion.

The "U" adhesion test procedure covers the fabrication and vulcanization of "U" adhesion specimens used in determining the static adhesion of tire cord to rubber. The "U" test is designed to measure the force required to pull a cord in the direction of its axis, from a strip of rubber in which the ends of the cord are embedded in the same rubber strip with the cord forming a "U" from which the test derives its name. The test is conducted substantially in accordance with ASTM D2138.

In the examples which follow test specimens of the cords were prepared in a consistent manner by placing a ¼-inch rubber strip in a mold, placing a test cord in a loop configuration to form a "U" on top of the rubber strip, placing a ¼-inch rubber strip on top of the cord and curing in a preheated press for 40 minutes at 300° F. under a 17-ton load. Similar specimens are prepared for test cords which have not been exposed to aging conditions.

The specimens are pulled on an Instron tester. Reported below is the percent "U" adhesion retained by the aged samples compared with the similar unaged samples.

EXAMPLE 1

Initially, a series of antioxidants were screened in overfinishes for effect on polyamide aged adhesion. Throughout the tests a drawn polyamide yarn of 1260 denier 204 filaments without any antioxidant compound incorporated in the polymer itself was utilized for overfinishing and for a control (Control I) without overfinish. A polyamide containing antioxidant incorporated in the polymer (Control II) was also used as a control. A nonionic finish based on rearranged glycerides was utilized as a spin finish for both yarns (Control I and Control II) at a targeted application of about 0.8 percent finish on the weight of the fiber.

Table 1 shows the results of initial screening, with the percent "U" adhesion retained for the particular compounds. The compounds listed were each applied to drawn polyamide yarn corresponding to Control I in an amount targeted to yield about 200 ppm of the antioxidant compound on the surface of the yarn with respect to the weight of the yarn. The treated yarns were visually inspected after 72 hours at ambient conditions to determine nonyellowing properties. The yarn sample having Irganox TM 565 deposited thereon displayed excellent retention of "U" adhesion and exhibited substantially no yellowing. In contrast, the yarn sample having Aminox TM and Cyanox TM antioxidants thereon, while displaying excellent retention of "U" adhesion, exhibited substantial yellowing after 72 hours storage at ambient conditions.

TABLE 1
ANTIOXIDANT IN OVERFINISHES

| Compound | Percent "U" Adhesion Retained | Remarks |
|---|---|---|
| 1. 1 part Aminox TM (diphenylamine-acetone reaction product from Uniroyal Chem.) + 4 parts Cyanox TM 1790 (available from Am. Cyanamid) | 78 | Substantial yellowing after 72 hr at ambient conditions |
| 2. Naugard TM 445 (secondary amine from Uniroyal) | 78 | Substantial yellowing after 72 hr at ambient conditions |
| 3. Cyanox TM 2777 (available from American Cyanamid) | 47 | Substantial yellowing after 72 hr at ambient conditions |
| 4. 1 part Aminox TM + 4 parts Naugard TM 445 | 80 | Substantial yellowing after 72 hr at ambient conditions |
| 5. 1 part Aminox TM + 4 parts Cyanox TM 2777 | 88 | Substantial yellowing after 72 hr at ambient conditions |
| 6. 1 part Aminox TM + 4 parts Bail TM (4,4'-Butylidenebis-6-tert-butyl-n-cresol from Monsanto) | 70 | Substantial yellowing after 72 hr at ambient conditions |
| 7. Irganox TM 565 (from Ciba-Geigy) | 82 | Substantially no yellowing |
| 8. Control I | 24 | |
| 9. Control II | 75 | |

EXAMPLE 2

Evaluation of different levels of Irganox TM 565 antioxidant applied to the yarn was conducted. The antioxidant was applied at various levels, given in weight percent based on weight of yarn, the yarn tested for retention of "U" adhesion and visually inspected for any discoloration. The yarn treated with Irganox TM 565 displayed no noticeable yellowing upon visual inspection after 72 hours storage at ambient conditions.

TABLE 2
IRGANOX TM 565 ANTIOXIDANT IN OVERFINISH

| Weight Percent Antioxidant | Percent "U" Adhesion Retained |
|---|---|
| 0.02 | 96 |
| 0.015 | 98 |
| 0.01 | 78 |
| 0.005 | 83 |
| Control I | 23 |
| Control II | 93 |

EXAMPLE 3

A first spin finish was prepared of the following components:

| | Parts by Weight |
|---|---|
| Caplube 8365 (rearranged coconut oil glyceride from Capitol City Products, Inc.) | 55 |
| POE (9) oleyl ether | 25 |
| POE (5) castor oil | 15 |
| POE (8) nonyl phenol | 3 |
| Irganox TM 565 antioxidant | 2 |

A second spin finish incorporated 12 parts by weight of Discosoft TM 567 (20 percent solid AC-680 oxidized polyethylene emulsion) with the above spin finish components. A third spin finish incorporated 21 parts by weight Discosoft TM 567 with the above spin finish components. A control utilized a spin finish with similar components as above with the omission of the antioxidant compound.

The spin finishes were applied to the yarn in a customary way during production of the yarn. The final drawn yarn products were tested for "U" adhesion retention and for other pertinent yarn properties. Testing showed no difference in other pertinent properties such as breaking strength, tenacity, modulus, toughness, LASE-5, dynamic flex, and disk fatigue. "U" adhesion retention is provided below in Table 3. No noticeable yellowing was observed after 72 hours at ambient conditions.

TABLE 3

| Spin Finish | Percent "U" Adhesion Retained |
|---|---|
| 1 | 80 |
| 2 | 82 |
| 3 | 86 |
| Control | 23 |

What is claimed:

1. An improved finish composition for polyamide yarn to be processed into tire cord, said improvement comprising a thio-triazine tert-butylphenol compound in an amount sufficient to provide enhanced aged adhesion retention of said tire cord to rubber.

2. The composition of claim 1 wherein said compound is 4-[(4,6-bis(octylthio)-s-triazin-2-yl)amino]-2,6-di-tert-butylphenol.

3. Polyamide yarn to be processed into tire cord having applied thereon the composition of claim 1.

4. The polyamide yarn of claim 3 having applied thereon from 0.003 to 0.1 weight percent of said compound, based on the weight of the yarn.

5. The polyamide yarn of claim 4 having applied thereon 0.01 to 0.03 weight percent of said compound.

6. The polyamide yarn of claim 3 wherein said compound is 4-[(4,6-bis(octylthio)-s-triazin-2-yl)amino]-2,6-di-tert-butylphenol.

7. The polyamide yarn of claim 6 having applied thereon from 0.003 to 0.1 weight percent of said compound, based on the weight of the yarn.

8. The polyamide yarn of claim 7 having applied thereon 0.01 to 0.03 weight percent of said compound.

9. A method of producing polyamide yarn to be processed into tire cord, said method comprising applying to polyamide yarn the finish composition of claim 1 in an amount sufficient to provide enhanced aged adhesion retention of said tire cord to rubber.

10. The method of claim 9 wherein from 0.003 to 0.1 weight percent of said compound, based on the weight of the yarn, is applied to the yarn.

11. The method of claim 10 wherein 0.01 to 0.03 weight percent of said compound is applied to the yarn.

12. An improved method of producing polyamide yarn to be processed into tire cord wherein said improvement comprises applying to polyamide yarn the finish composition of claim 2 in an amount sufficient to provide enhanced aged adhesion retention of said tire cord to rubber.

13. The method of claim 12 wherein from 0.003 to 0.1 weight percent of said compound, based on the weight of the yarn, is applied to the yarn.

14. The method of claim 13 wherein 0.01 to 0.03 weight percent of said compound is applied to the yarn.

* * * * *